US012597365B2

(12) United States Patent
Rahmani et al.

(10) Patent No.: US 12,597,365 B2
(45) Date of Patent: Apr. 7, 2026

(54) AUTOMATIC TRANSLATION BETWEEN SIGN LANGUAGE AND SPOKEN LANGUAGE

(71) Applicant: Sorenson IP Holdings, LLC, Salt Lake City, UT (US)

(72) Inventors: Mariam Rahmani, Folsom, CA (US); Adam Munder, Phoenix, AZ (US); Marina Lovell, Folsom, CA (US); Abolfazl Zargari Khuzani, Campbell, CA (US); John K. Hines, Portland, OR (US); Katalin Bartfai-Walcott, El Dorado Hills, CA (US); Naveen Kulkarni, Rancho Cardova, CA (US); Shashank Bujimalla Venkata Sesha, Portland, OR (US); Abolfazl Ravanshad, Santa Clara, CA (US)

(73) Assignee: Sorenson IP Holdings, LLC, Salt Lake City, UT (US)

( * ) Notice: Subject to any disclaimer, the term of this patent is extended or adjusted under 35 U.S.C. 154(b) by 437 days.

(21) Appl. No.: 17/992,605

(22) Filed: Nov. 22, 2022

(65) Prior Publication Data

US 2023/0085161 A1    Mar. 16, 2023

Related U.S. Application Data

(60) Provisional application No. 63/356,745, filed on Jun. 29, 2022.

(51) Int. Cl.
| | | |
|---|---|---|
| *G09B 21/04* | (2006.01) | |
| *G10L 13/00* | (2006.01) | |
| *G10L 21/10* | (2013.01) | |

(52) U.S. Cl.
CPC .............. *G09B 21/04* (2013.01); *G10L 13/00* (2013.01); *G10L 21/10* (2013.01)

(58) Field of Classification Search
CPC .......... G09B 21/04; G10L 13/00; G10L 21/10
See application file for complete search history.

(56) References Cited

U.S. PATENT DOCUMENTS

| | | | | |
|---|---|---|---|---|
| 11,847,426 B2 * | 12/2023 | Retek | ...................... | G06F 3/014 |
| 11,935,170 B1 * | 3/2024 | Jain | ........................ | G06V 40/28 |
| 2011/0301934 A1 | 12/2011 | Tardif | | |

FOREIGN PATENT DOCUMENTS

| | | | | |
|---|---|---|---|---|
| BR | 102019028311 A2 * | 7/2021 | .......... | G06T 13/205 |
| WO | 2019094618 | 5/2019 | | |

OTHER PUBLICATIONS

Dan Song et al., Chinese sign language synthesis system on mobile device, Procedia Engineering, 2012 (Year: 2012).*

(Continued)

*Primary Examiner* — Bhavesh M Mehta
*Assistant Examiner* — Eunice Lee
(74) *Attorney, Agent, or Firm* — Maschoff Brennan

(57) ABSTRACT

Methods, apparatus, systems, and articles of manufacture to translation between sign language and spoken language are disclosed. An example apparatus includes processor circuitry to at least one of instantiate or execute machine readable instructions to identify a plurality of candidate signs across different frames in video; associate a respective gloss to respective ones of the candidate signs; associate a respective confidence score with the respective glosses; identify overlapping frames of the candidate signs; select one or more of the candidate signs as performed signs based on the respective confidence scores and overlapping frames; and convert the performed signs to audio data.

20 Claims, 10 Drawing Sheets

(56) References Cited

OTHER PUBLICATIONS

Cherniavsky et al., Variable frame rate for low power mobile sign language communication, Proceedings of the 9th international ACM SIGACCESS conference on Computers and accessibility, 2007 (Year: 2007).*

Zeng et al., Highly fluent sign language synthesis based on variable motion frame interpolation, 2020 IEEE International Conference on Systems, Man, and Cybernetics (SMC), 2020 (Year: 2020).*

Stoll et al., Signsynth: Data-driven sign language video generation, European Conference on Computer Vision, 2020 (Year: 2020).*

Kara Technologies, "Making content accessible to sign language users," retrieved on Aug. 24, 2022, 9 pages.

SIGNALL, "A communication bridge between d/Deaf and hearing," retrieved on Aug. 24, 2022, 10 pages.

SIGNTEL, "Signtel Interpreter," retrieved on Aug. 24, 2022, 5 pages.

The Economic Times, Panache, "Meet the new google translator: an AI app that converts sign language into text, speech", Oct. 26, 2018, 18 pages.

"English to Sign Language (ASL) Translator, Text to ASL Generator Tool", retrieved on Aug. 24, 2022, 2 pages.

Camgöz et al., "Sign Language Transformers: Joint End-to-End Sign Language Recognition and Translation"; CVSSP, Univ. of Surrey, Guildford, UK; Microsoft, Munich, Germany, 2020, 11 pages.

* cited by examiner

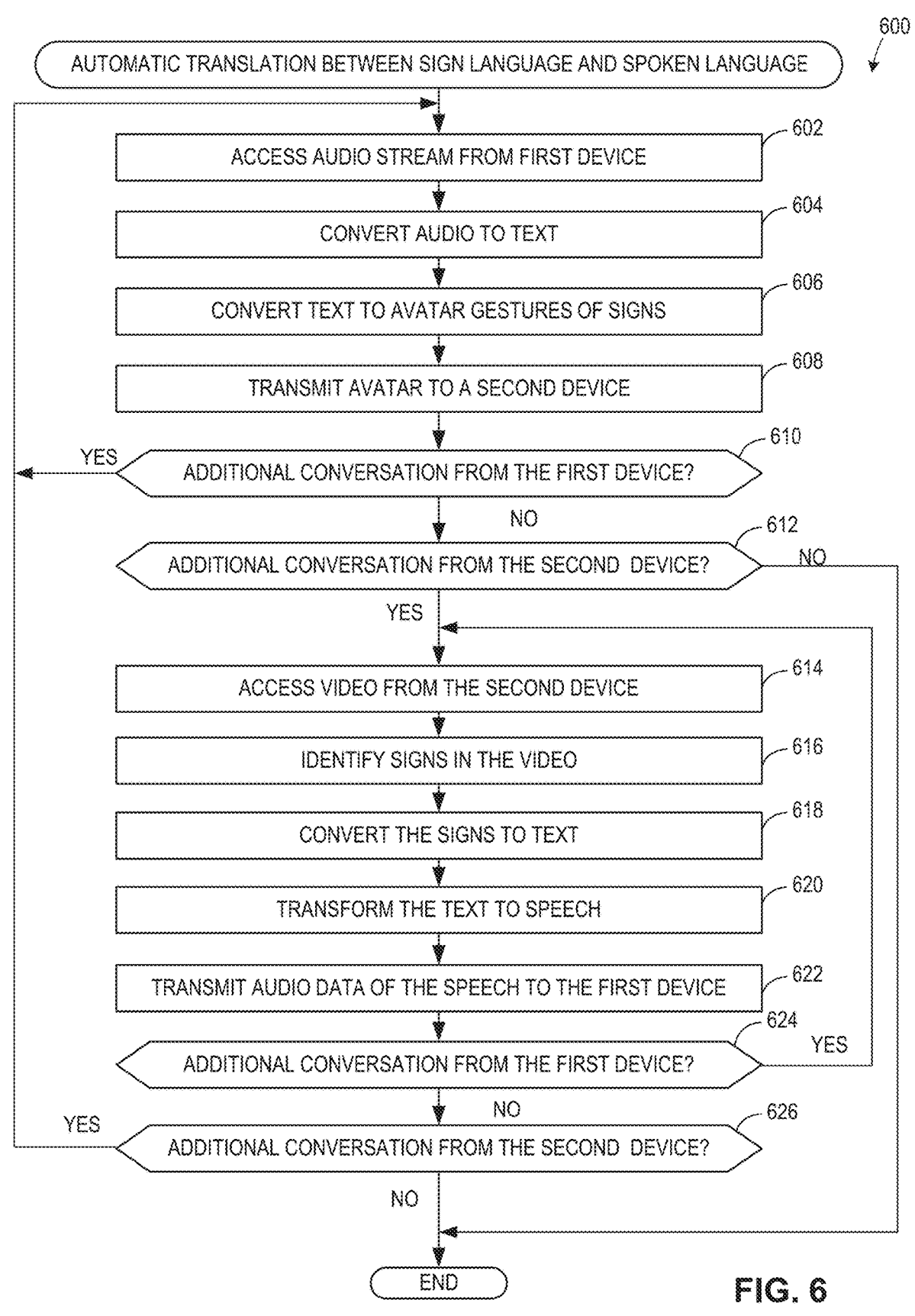

600

AUTOMATIC TRANSLATION BETWEEN SIGN LANGUAGE AND SPOKEN LANGUAGE

ACCESS AUDIO STREAM FROM FIRST DEVICE — 602

CONVERT AUDIO TO TEXT — 604

CONVERT TEXT TO AVATAR GESTURES OF SIGNS — 606

TRANSMIT AVATAR TO A SECOND DEVICE — 608

ADDITIONAL CONVERSATION FROM THE FIRST DEVICE? — 610    YES

NO

ADDITIONAL CONVERSATION FROM THE SECOND  DEVICE? — 612    NO

YES

ACCESS VIDEO FROM THE SECOND DEVICE — 614

IDENTIFY SIGNS IN THE VIDEO — 616

CONVERT THE SIGNS TO TEXT — 618

TRANSFORM THE TEXT TO SPEECH — 620

TRANSMIT AUDIO DATA OF THE SPEECH TO THE FIRST DEVICE — 622

ADDITIONAL CONVERSATION FROM THE FIRST DEVICE? — 624    YES

NO

ADDITIONAL CONVERSATION FROM THE SECOND  DEVICE? — 626    YES

NO

END

FIG. 6

AUTOMATIC TRANSLATION BETWEEN SIGN LANGUAGE AND SPOKEN LANGUAGE

RELATED APPLICATION

This patent claims the benefit of U.S. Provisional Patent Application No. 63/356,745, which was filed on Jun. 29, 2022. U.S. Provisional Patent Application No. 63/356,745 is hereby incorporated herein by reference in its entirety. Priority to U.S. Provisional Patent Application No. 63/356, 745 is hereby claimed.

FIELD OF THE DISCLOSURE

This disclosure relates generally to translation and, more particularly, to automatic translation between sign language and spoken language.

BACKGROUND

Communication between a deaf person and a hearing person is typically accomplished through human interpreters.

BRIEF DESCRIPTION OF THE DRAWINGS

FIG. 6 is a flowchart representative of example communication machine readable instructions and/or example operations that may be executed by example processor circuitry to implement the example translation server 110 of FIG. 3.

In general, the same reference numbers will be used throughout the drawing(s) and accompanying written description to refer to the same or like parts. The figures are not to scale.

DETAILED DESCRIPTION

Figure 1:
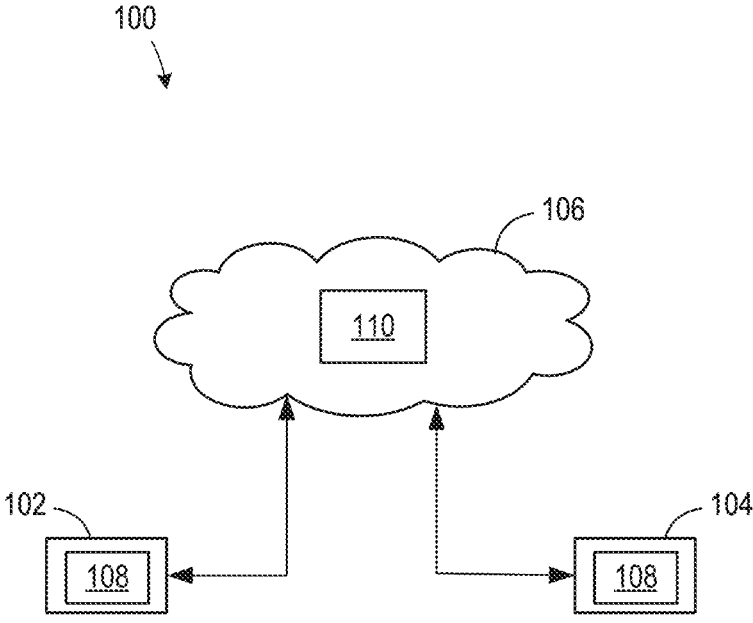
FIG. 1 is a schematic illustration of an example system to automatically translate between sign language and spoken language.

Communication between members of the deaf or hard of hearing population and members of the hearing population typically involves a human interpreter, handwriting back and forth, informal gestures, and/or one-directional speech to text solutions. These communication mediums can be hard to use, expensive, not available on-demand, slow, incomplete, and/or ambiguous. In addition, use of third-party human interpreters compromises the privacy of the conversation between the deaf person and the hearing person.

The examples disclosed herein enable deaf and hard of hearing people and hearing people to communicate with each other bidirectionally between sign language and spoken language. Examples disclosed herein may also be used for teaching sign language through, for example, self-training.

The example devices, systems, methods, and articles of manufacture disclosed herein provide automatic translation between sign language and spoken language. The examples disclosed herein translate or interpret voice from a hearing person into a signing avatar to be presented on a screen of an electronic device for a deaf person. The examples disclosed herein translate or interpret the sign language videos of the deaf person into spoken words for the hearing person. Also, in some examples, a text translation of the spoken language is presented to the deaf person and/or a text translation of the sign language is presented to the hearing person. In some examples, the text translations are presented at the same time and the audio and/or sign avatars.

The translations generated by the examples disclosed herein are accurate and expeditious. The translations generated by the examples disclosed herein improve user privacy because a third-party interpreter does not participate in the translation and, thus, does not hear the conversation. Also, without a third-party interpreter, translation costs are reduced. Without needing to involve a third-party interpreter, the examples disclosed herein facilitate ad-hoc conversations between the deaf or hard of hearing community and the hearing community. In addition, the translations generated by the examples disclosed herein are unambiguous because informal gestures that lack widely understood meaning are not components of or otherwise considered in the translation. The examples disclosed herein also facilitate a more natural conversation between the deaf or hard of hearing community and the hearing community than, for example, an exchange of handwritten notes back and forth. In addition, the examples disclosed herein enable a larger diversity of culture because deaf and hard of hearing people are able to communicate in settings in which they may otherwise have been precluded.

As used herein, "deaf" is a term meant to encompass people who are deaf, people who are hard of hearing, and students of sign language. Thus, the term deaf in this disclosure is shorthand to represent these communities and anyone else using sign language for communication.

A "gloss" is a word associated with a sign. In other words, a gloss is a label or a name for a sign. In American Sign Language (ASL), a gloss is an English word that is used to name the ASL sign. The gloss does not necessarily relay the meaning of the sign. Also, the gloss is not a transcription of the sign and does not provide information as to how to create or recognize the sign. A "referent" is the meaning associated with a sign.

As used herein, an "avatar" is an icon or figure presented on a display. For example, an avatar could be an image of a real or animated human. Avatars are described throughout this disclosure as representations of manual signs used in sign language.

Unless specifically stated otherwise, descriptors such as "first," "second," "third," etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly that might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified in the below description. As used herein "substantially real time" refers to occurrence in a near instantaneous manner recognizing there may be real world delays for computing time, transmission, etc. Thus, unless otherwise specified, "substantially real time" refers to real time+/−1 second.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "processor circuitry" is defined to include (i) one or more special purpose electrical circuits structured to perform specific operation(s) and including one or more semiconductor-based logic devices (e.g., electrical hardware implemented by one or more transistors), and/or (ii) one or more general purpose semiconductor-based electrical circuits programmable with instructions to perform specific operations and including one or more semiconductor-based logic devices (e.g., electrical hardware implemented by one or more transistors). Examples of processor circuitry include programmable microprocessors, Field Programmable Gate Arrays (FPGAs) that may instantiate instructions, Central Processor Units (CPUs), Graphics Processor Units (GPUs), Digital Signal Processors (DSPs), XPUs, or microcontrollers and integrated circuits such as Application Specific Integrated Circuits (ASICs). For example, an XPU may be implemented by a heterogeneous computing system including multiple types of processor circuitry (e.g., one or more FPGAs, one or more CPUs, one or more GPUs, one or more DSPs, etc., and/or a combination thereof) and application programming interface(s) (API(s)) that may assign computing task(s) to whichever one(s) of the multiple types of processor circuitry is/are best suited to execute the computing task(s).

FIG. 1 is a schematic illustration of an example system 100 to automatically translate between sign language and spoken language. The example system 100 includes an example first user device 102 and an example second user device 104. The first user device 102 and the second user device 104 are communicatively coupled via an example network 106. The network 106 may be an edge and/or cloud environment accessible via the internet.

The first user device 102 is an electronic device usable by, for example, a hearing person. The second user device 104 is an electronic device usable by, for example, a deaf person. The first user device 102 and the second user device 104 each include an example translation application ("app") 108 that enables translation between sign language and spoken language. The network hosts an example translation server 110. The translation server 110 performs the translation between sign language and spoken language.

A hearing person may speak into the first user device 102. The translation app 108 of the first user device 102 sends audio data representing the speech to the translation server 110. The translation server 110 applies an automatic speech recognition (ASR) model to transform the audio data into text. The translation server 110 applies a sign/text model to translate the text into one or more avatars that perform manual signs that interpret the text in sign language. The "sign/text" model is a model that translates text into sign language and sign language into text, with the sign language represented by avatars. The avatars generated by the sign/text model are sign language corresponding to the speech input at the first user device 102. The translation server 110 sends the avatars to the translation app 108 on the second user device 104. The avatars are presented on a display of the second user device 104 to a deaf person.

The system 100 also operates in the reverse direction. For example, a deaf person may generate signs in the field of view of a camera of the second user device 104. The translation app 108 of the second user device 104 sends video data representing the signs to the translation server 110. The translation server 110 applies the sign/text model to transform the video data into text. The translation server 110 applies a text-to-speech (TTS) model to translate the text into speech (audio data). Thus, the speech is spoken language corresponding to the video of sign language input at the second user device 104. The translation server 110 sends the audio data to the translation app 108 on the first user device 102. The audio data is presented as speech via one or more loudspeakers of the first user device 102 to the hearing person. That is, the audio data is convertible into a sound wave.

In some examples, the translation server 110 is implemented by a single edge device. In some examples, the translation server 110 is implemented by a network of distributed edge devices. In some examples, the translation server 110 is implemented by an ad hoc edge infrastructure. In some examples, the translation server 110 is implemented across the edge and cloud. In some examples, the translation server 110 is implemented in the cloud.

In some examples, the ASR model and the TTS model are implemented on the first user device 102. Also, in some examples, the sign/text model is implemented on the second user device 104. In these examples, text is transmitted between the translation apps 108 on the respective user devices 102, 104 and the translation server 110.

Figure 2:
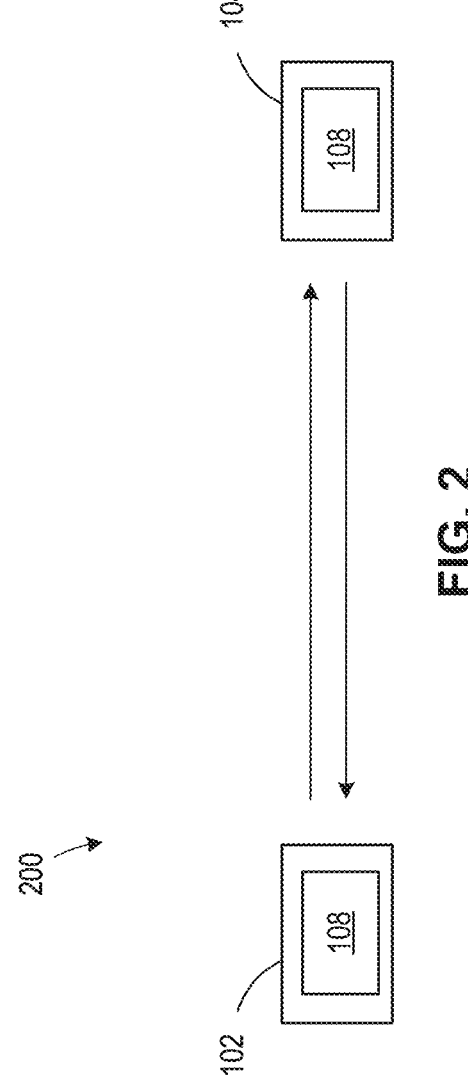
FIG. 2 is a schematic illustration of another example system to automatically translate between sign language and spoken language.

FIG. 2 is a schematic illustration of another example system 200 to automatically translate between sign language and spoken language. In the example of FIG. 2, the first user device 102 and the second user 104 are communicatively coupled via, for example, a Bluetooth® connection or the internet. In this example, the first user device and the second user device include an example translation app 202. The translation app 202 includes the capabilities to implement the ASR model, the TTS model, the sign/text model, and the translation apps 108 disclosed above. Thus, the hearing person and the deaf person can communicate with each other via their respective devices 102, 104 in this example without edge or cloud computing.

The sign/text model is an artificial intelligence (AI) model. AI, including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In general, machine learning models/architectures that are suitable to use in the example approaches disclosed herein will be a convolutional neural network (CNN). However, other types of machine learning models could additionally or alternatively be used such as, for example, sequence-to-sequence transformer based models, reinforcement learning models, etc.

In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed. Hyperparameters are defined to be training parameters that are determined prior to initiating the training process. Some example hyperparameters include a learning rate, a number of layers to be used in the machine learning model, etc.

The hyperparameters are incorporated into a training module (training configurations of a training server) and an inference module (inference configurations of an inference server). The training module and the inference module work cohesively with an amount of quality data to provide accurate results. For example, data is passed and processed in the training module using training parameters, testing parameters, and model parameters. The parameters are set and used to provide a model with the maximum accuracy. In some examples, the parameters from the training module are fixed and then used in the inference module. The inference module also uses some additional parameters such as, for example, inference parameters to ensure minimum latency of running model and maximum accuracy.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.) Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent (SDG) as an optimization method to reduce the loss in training. However, any other training algorithm may additionally or alternatively be used. In examples disclosed herein, training is performed until the error rate does not change significantly any further in training process. In other words, training is performed until an acceptable amount of error is achieved. In examples disclosed herein the amount of training is based on the selected hyperparameters and the size of dataset. In examples disclosed herein, training is performed locally (e.g., at an edge device) and/or remotely (e.g., at a central facility and/or in the cloud). In examples disclosed herein, where the training occurs is based on the capability of the edge processor, the type of processor, and/or the amount of data available for training. Furthermore, training can be done incrementally or in whole, depending on the requirement.

Training is performed using hyperparameters that control how the learning is performed (e.g., a learning rate, a number of layers to be used in the machine learning model, etc.). Such hyperparameters are selected, for example, for and/or during hyperparameter tuning. Some example hyperparameters include numbers of layers in an encoder or a decoder (which defines the size of the model), optimization method (which defines what optimization method is used in back propagation such as, for example, the Adam optimization method, SGD, etc.), batch size, number of epochs, learning rate, validation frequency, dropout, etc. In some examples re-training may be performed. Such re-training may be performed in response to, for example, satisfying at least one of several thresholds including, for example, (1) because the size of dataset grows daily, a weekly cadence can be set to retrain and deploy the model when the size of the dataset grows and reach specific threshold and/or there are other additions to the number of signs and glosses in dataset; (2) when testers and users test the model and request changes and/or report inaccuracies, then capabilities are added to the algorithm, and/or annotations are changed and the algorithm can be retrained and redeployed, and/or (3) when the algorithm is changed and/or advanced, retraining can occur to improve the translation accuracy.

Training is performed using training data. In examples disclosed herein with supervised training, the training data is labeled. Dataset labeling or annotation is applied to the training data by sign language linguists and/or experts. In some examples, the labeling of training data is a manual process assisted by automated tools. In some examples, the training data is pre-processed using, for example, image processing techniques to, for example brighten an image. In some examples, the training data is sub-divided into training, development, and test data.

Once training is complete, the model is deployed for use as an executable construct that processes an input and provides an output based on the network of nodes and connections defined in the model. The model is stored at the database 304 of the translation server 110. The model may then be executed by the sign/text engine 314 of the translation server 110.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In some examples, input data undergoes pre-processing before being used as an input to the machine learning model. Moreover, in some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

Figure 3:
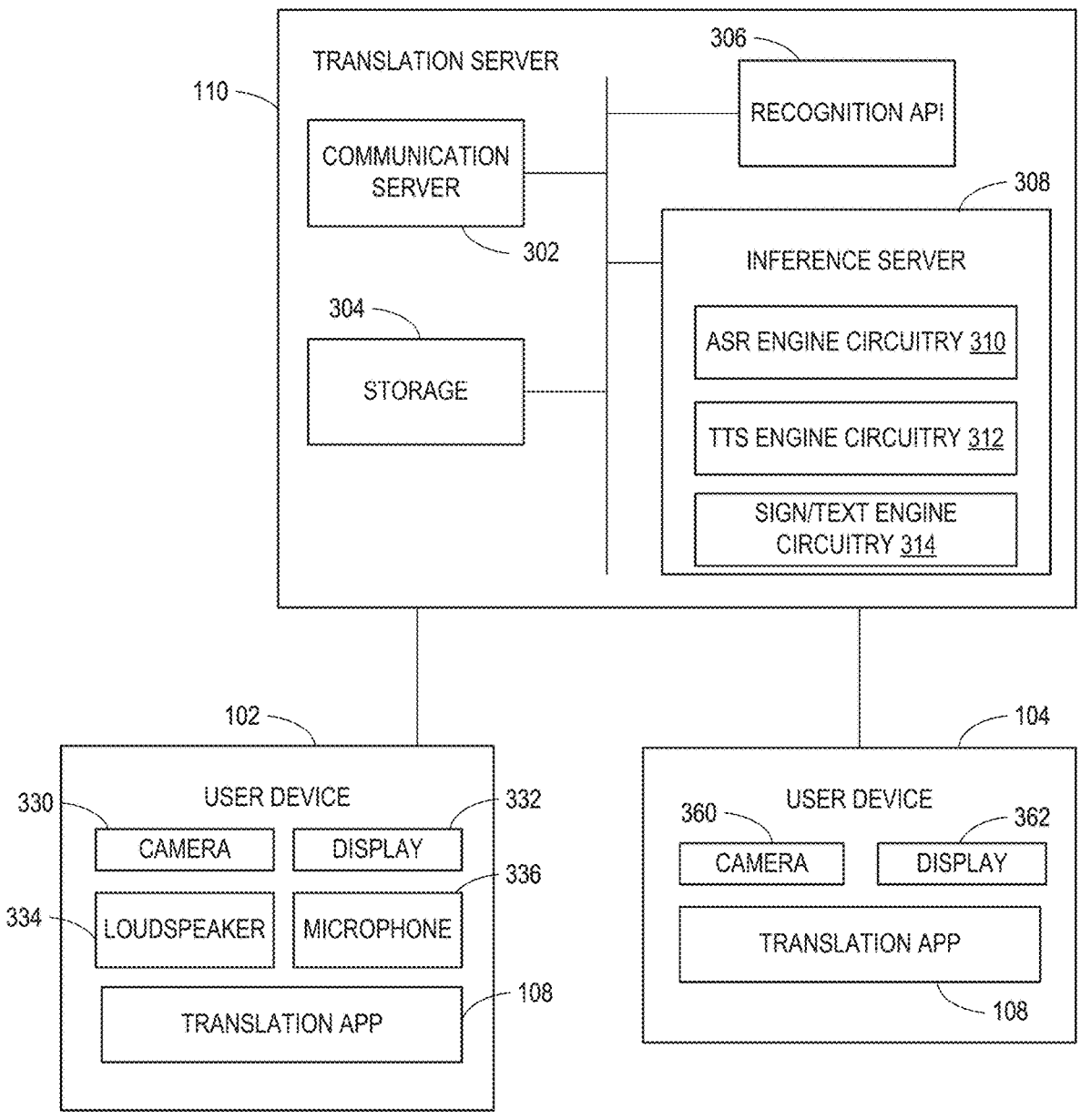
FIG. 3 is a block diagram of the example system of FIG. 1.

FIG. 3 is a block diagram of the example system 100 of FIG. 1 to automatically translate between sign language and spoken language. The translation server 110 includes an example communication server 302, an example database or storage 304, an example recognition application programming interface (API) 306, and an example inference server 308. The inference server 308 includes example ASR engine circuitry 310, example TTS engine circuitry 312, and example sign/text engine circuitry 314. The first user device 102 includes an example camera 330, an example display 332, an example loudspeaker 334, an example microphone 336, and the translation app 108. The second user device 104 includes an example camera 360, an example display 362, and the translation app 108. In some examples, the first user device 102 and the second user device 104 include the same components.

One of the first user (e.g., a hearing person) or the second user (e.g., a deaf person) can start a conversation with the other. For example, the hearing person using the first user device 102 can open the translation app 108, which interfaces with the communication server 302 of the translation server 110. The hearing person can speak and his or her voice will be captured by the microphone 336. The microphone 336 converts the sound into audio data. The translation app 108 transmits the audio data to the translation server 110 via the communication server 302. In some examples, the communication server 302 stores the audio data in the storage 304. The recognition API 306 indicates that a translation has been started. In some examples, the indication is sent to the hearing person and/or the deaf person. In other examples, the indication is used internally in the translation server 110.

The inference server 308 translates the spoken language to sign language. For example, the ASR engine circuitry 310 converts the audio data into text. In some examples, the ASR engine circuitry removes background noise and normalizes the volume of the audio data. The ASR engine circuitry applies AI to process the audio data into the text. In some examples, the ASR engine circuitry transforms the audio data into phonemes, analyzes the phonemes, groups the phonemes together into words, and groups the words into sentences. In other examples, the ASR engine circuitry applies other techniques for converting audio data to text. In some examples, the ASR engine identifies volume, cadence, tone, and/or emotion of the speech. In some examples, the text is tagged with metadata indicative of the volume, cadence, tone, and/or emotion.

The sign/text engine circuitry 314 applies the sign/text model to transform the text into an avatar that gestures a sign of sign language. In some examples, the sign/text engine circuitry 314 uses AI to implement the sign/text model. In some examples, the sign/text engine circuitry 314 identifies a sign for the text by accessing a library and signs and text in the storage 304. In some examples, the sign/text engine circuitry 314 generates a sign based on the meaning of the text and a volume, cadence, tone, and/or emotion of the speech.

The communication server 302 transmits the avatars to the second user device 104 via the translation app 108. The translation app 108 presents the avatar to the deaf person via the display 362 of the second user device 104. In some examples, the communication server 302 transmits the text to the second user device 104 via the translation app 108 for presentation to the deaf person on the display 362. In some examples, the communication server 302 stores the avatar and the text with the audio data in the storage 304. In some examples, the communication server 302 stores a correlation between the avatar and the text in the storage 304. In some examples, data is stored in one or more formats such as, for example, video, image, text, and/or key points formats. Key points are features of a person's body and movement as disclosed below. In some examples, the key point format includes human skeleton key points. This example reduces the amount of storage space used, which also reduces storage costs. Also, in some examples, the number of key point files stored on the disk are minimized for each video, which leads to a gain in effective computational performance. These examples with a reduction in the amount of stored data enables increased accessibility to the data and timeliness in data retrieval. Efficient and effective retrieval of data facilitates real time translation between sign language and spoken language.

The system 100 also handles communication and translation in the other direction, from the deaf person to the hearing person. For example, the deaf person using the second user device 104 can open the translation app 108, which interfaces with the communication server 302 of the translation server 110. The deaf person can generate signs in front of the camera 360 of the second device 104. The camera 360 may be any type of camera. In some examples, the translation app 108 provides visual indications to the deaf person indicating if he or she is properly distanced from the camera and/or otherwise positioned within the field of view of the camera so that the translation app 108 can capture the signs. For example, there may be a rectangle, crosshairs, or other framing on the display 362 that shows if the deaf person is in the correct distance of the camera and/or position within the field of view of the camera for translation. The framing can change between colors such as, for example, red and green to indicate the improper or proper position. In some examples, the screen itself may turn colors such as, for example, to green from red, if the deaf person can be seen from waist up to capture enough of the deaf person's body that is used in sign language. This is used to make sure the high-quality key points can be detected from the signing.

The translation app 108 transmits the video data from the camera 360 to the translation server 110 via the communication server 302. In some examples, the communication server 302 stores the video data in the storage 304. The recognition API 306 indicates that a translation has been started. In some examples, the indication is sent to the hearing person and/or the deaf person. In other examples, the indication is used internally in the translation server 110.

The inference server 308 translates the signs in the video to speech. For example, the sign/text engine circuitry 314 applies the sign/text model to transform signs in the video into text. In some examples, the sign/text engine circuitry 314 uses AI to implement the sign/text model. One or more different AI models may be used as disclosed herein. For example, in some examples, the sign/text engine circuitry 314 identifies a sign in the video by recognizing key points. The key points are based on features of the deaf person's body and movement. In some examples, the key points are based on hand shape, hand orientation, and hand location. In some examples, the key points are based on movement of one or more of the hands, face, head, torso, mouthing, and/or finger spelling. In some examples, the key points are based on rhythm, cadence, eye gaze, and/or pauses. Any, all, and other features may be used to identify key points to be used in identifying a sign.

In some examples, the sign/text engine circuitry 314 implements an example sign-to-gloss translation model that translates signs detected in the video to a gloss on a sign-by-sign basis (e.g., for discrete single signs). In this example, the inference server 308 enhances the brightness and contrast of the input video frame to facilitate obtaining visual features from the video. The sign/text engine circuitry 314 uses a pre-trained feature extraction model such as, for example, a machine learning model capable of analyzing live and/or streaming media (e.g., MediaPipe). As a visual language, ASL and other sign languages utilize multiple complementary channels to convey information. Such channels include manual features, such as for example, hand shape, movements, and pose as well as non-manuals features, such as for example, facial expression, mouth gestures, and movement of the head, shoulders, and torso. The sign/text engine circuitry 314 implements the example sign-to-gloss translation model to extract useful visual features from the video frames of the sign video such as the signer body joints that are most correlated to the sign motions. The useful features are key points such as, for example, the key points disclosed above. In addition, the sign/text engine circuitry 314 implements the sign-to-gloss translation model to remove the non-useful and non-related background features and artifacts. This feature extraction and/or replacement significantly increases the accuracy of sign recognition compared to the previous models.

Implementing the sign-to-gloss translation model, the sign/text engine circuitry 314 also removes the non-useful frames such as, for example, where the signer has not yet started. In some examples, the sign/text engine circuitry 314 identifies when the signer raises their hand(s) and starts signing to identify frames of video to analyze. Additionally or alternatively, the sign/text engine circuitry 314 distinguishes between a valid sign (e.g., of ASL) versus a signer's non-sign language movements. Thus, in this example, only the frames of video with valid signs are processed. This reduces the processing resources and bandwidth required to analyze the video.

The sign/text engine circuitry 314 also transforms the useful features or key points to a more static reference model. This transformation removes unwanted variations such as, for example, body size, signing speed, lower body visibility, body orientation, zoom, crop, etc. This transformation also helps the AI model create a reference upper body model with constant body joint distances. In some examples, the sign/text engine circuitry 314 also transforms the signing in the video to a constant signing speed to facilitate analysis.

Implementing the sign-to-gloss translation model, the sign/text engine circuitry 314 also trains a single sign recognition model, which is a transformer-based model. In some examples, the single sign recognition model is based on ASL signs. In other examples, other sign languages may be used in addition to or as an alternative to ASL. The single sign recognition model is trained with a number of single sign videos and key points obtained from the reference model. The trained single sign recognition model inputs single sign video key points and outputs a gloss label with a rank or confidence score (CS). In some examples, the confidence score is determined through a probability function applied to the output of the single sign recognition model. This probability score indicates a confidence level that the sign/text engine circuitry 314 has extracted the correct gloss label. In some examples, the CS ranges from 0 to 1, where the most confident recognition achieves CS=1.

The sign-to-gloss translation model also includes an inference phase. In the inference phase, the sign/text engine circuitry 314 runs a selective sign search algorithm involving the trained single sign recognition model. The goal of the search algorithm is video segmentation. With the search algorithm, the sign/text engine circuitry 314 detects the single sign video segments within a full-sentence continuous sign video (containing a sequence of single signs) that are most similar (with the highest CS) to the single signs used in the training process of the recognition model.

Figure 4:
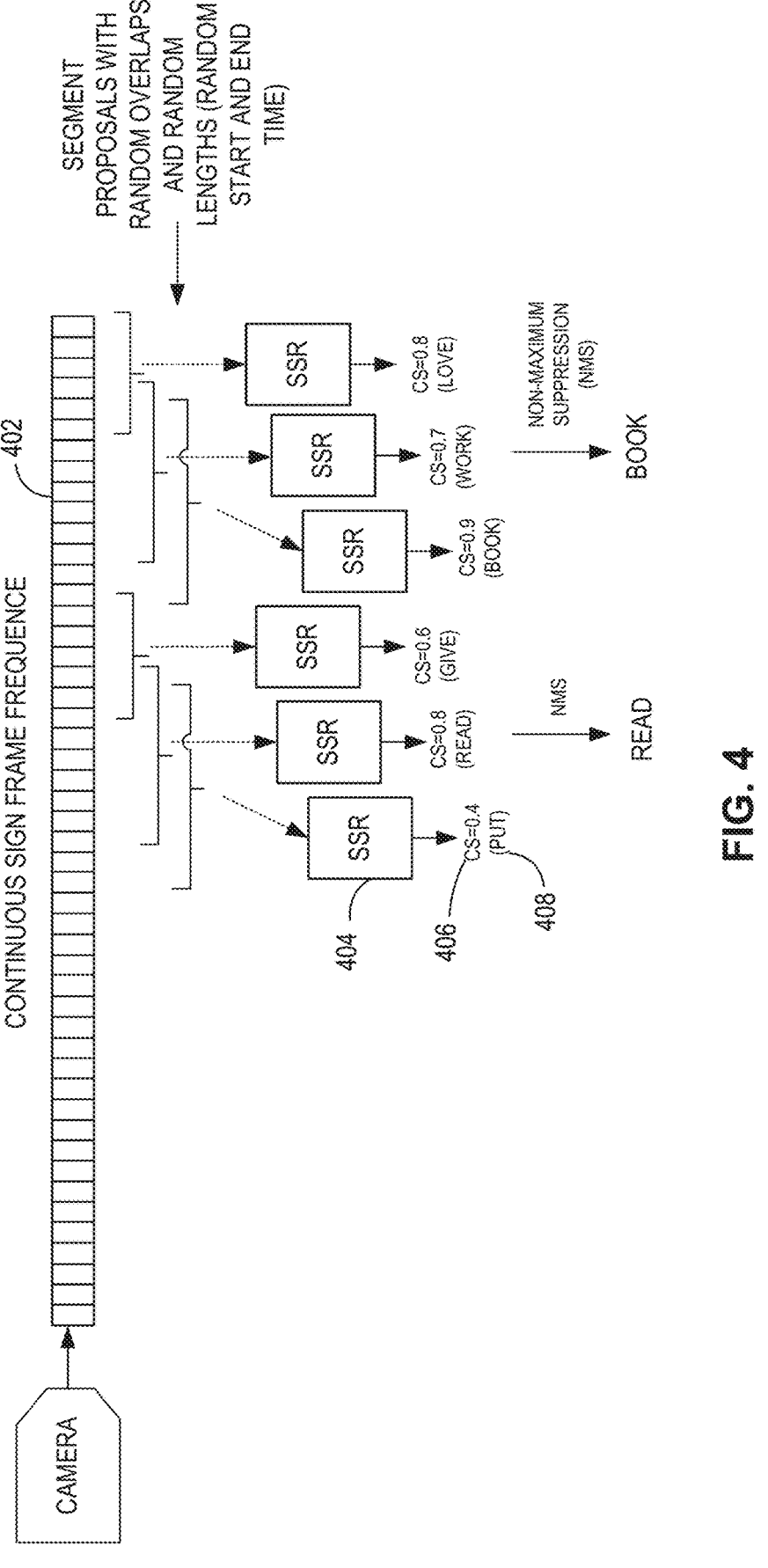
FIG. 4 is an illustration of an example video frame sampling and single sign recognition process.

FIG. 4 illustrates an example selective sign search process. In this example, the sign/text engine circuitry 314 creates a list of random video segment proposals 402 (with a random start and end time) within the full-sentence continuous sign video. The video is segmented with time stampings. For example, the sign/text engine circuitry 314 creates a list of 1000 random video segments. Other examples may include other numbers of video segments. The sign/text engine circuitry 314 feeds the video segment proposals into a trained single sign recognition model 404 and determines corresponding confidence scores (CS) 406 and gloss labels 408. In the example of FIG. 4, the sign/text engine circuitry 314 determines a first potential or candidate sign with a CS 406 of 0.4 and a gloss label 408 of "put" in a first plurality of video segments 402; a second potential or candidate sign with a CS 406 of 0.8 and a gloss label 408 of "read" in a second plurality of video segments 402; a third potential or candidate sign with a CS 406 of 0.6 and a gloss label 408 of "give" in a third plurality of video segments 402; a fourth potential or candidate sign with a CS 406 of 0.9 and a gloss label 408 of "book" in a fourth plurality of video segments 402; a fifth potential or candidate sign with a CS 406 of 0.7 and a gloss label 408 of "work" in a fifth plurality of video segments 402; and a sixth potential or candidate sign with a CS 406 of 0.8 and a gloss label 408 of "love" in a sixth plurality of video segments 402. The different pluralities of video segments may overlap, not overlap, and/or partially overlap. In addition, the different pluralities of video segments may include the same or a different number of video segments 402 during which a potential sign is identified.

The sign/text engine circuitry 314 uses a Non-Maximum Suppression (NMS) algorithm to extract the most confident video segments and remove low-confident segments and overlaps. In the example of FIG. 4, the sign/text engine to circuitry 314 uses the CS values and the non-overlapping video segments to determine that the video contains the signs for "read" and "book." The sign/text engine circuitry 314 tags the gloss labels with their respective time stampings and sorts the detected gloss labels in the order of their location in the video. In the example of FIG. 4, the gloss labels are sorted to indicate that the signer signed the word "read" before the word "book" in the video.

The sign-to-gloss translation model is used to detect and segment the signs (with their time stampings) in a continuous full-sentence sign video by employing the single sign recognition model that is trained with a dataset of discrete single signs. The sign-to-gloss translation model uses knowledge from the single signs to translate a full sentence sign video. A continuous full-sentence sign video is not required (as an input) to sequence the gloss labels. The sign-to-gloss translation model is much less sensitive to the order of signs in a video compared to previous models, which are sensitive to the order of signs in the input sign video because the conventional models look at the signs that come after and before the target signs.

In addition, the sign-to-gloss translation model can be trained with a smaller training dataset (only a certain number of single signs can effectively train the model) compared to the previous models that require a huge dataset of full sentences videos to learn all the possible sign combinations in a continuous sign video. The sign-to-gloss translation model also can be used to transfer the knowledge from short sign videos learning to long sign videos learning and vice versa.

Another example model implemented by the sign/text engine circuitry 314 includes an example sign annotation model. In some examples, the sign annotation model includes an algorithm to efficiently collect a dataset of annotated continuous single signs from a set of glossed full sentence sign videos using AI model training cycles.

With the sign annotation model, the sign/text engine circuitry 314 trains a single sign recognition model with discrete single signs using a first number of discrete single signs. In some examples, the first number of discrete single signs is a limited and/or specific number of discreate single signs. The sign/text engine circuitry 314 uses the trained model and a search algorithm to extract continuous sign segments (that are most similar to the discrete signs used in training) in a full sentence sign video. With the search algorithm, the sign/text engine circuitry 314 is able to find the continuous sign time stampings with their respective gloss labels. The result is a dataset of annotated continuous single signs extracted from a set of full sentence sign videos.

The sign/text engine circuitry 314 repeats the training cycle with a mix of a plurality of previous discrete signs and a plurality of continuous single signs obtained from the prior training cycle. This provides a new or updated training dataset. With the updated training dataset, the sign/text engine circuitry 314 can train a stronger and more accurate sign recognition model because the sign/text engine circuitry 314 sees and learns more sign variations in the training process and, as a result, the sign/text engine circuitry 314 detects and segments more new continuous single signs in the same set of full sentence videos.

The sign/text engine circuitry 314 can repeat more training cycles to train a more accurate model and collect a larger dataset of continuous signs without any manual annotation effort.

Training a good AI model uses a large number of annotated signs. Annotation processes are usually completed manually using different customized software tools, which is very time-consuming and expensive. The example sign annotation model disclosed herein is automated, less costly, and much faster than prior methods that manually upload the video into software tools and manually annotate the time-stamping of each sign within the input video. In addition, the prior methods require annotators to have knowledge of sign recognition, which is labor-intensive and expensive.

Another example model implemented by the sign/text engine circuitry 314 includes an example speed variation model. Different people sign at different speeds. In addition to using training techniques such as, for example, data augmentation with different frame sub-sampling rates, the sign/text engine circuitry 314 can identify key point displacement. The key point displacement can be used to track the speed of signing and compare the speed with that of training dataset. In some examples, the speed of the training dataset is a threshold speed. In some examples, if speed of the signing in the video is too low (e.g., below the threshold), the sign/text engine circuitry 314 increases frame subsampling and/or skip frames that are analyzed. In some examples, if speed is too high (e.g., above the threshold), the sign/text engine circuitry 314 interpolates and creates synthetic intermediate key point frames.

Another example model implemented by the sign/text engine circuitry 314 includes an example single model for both single sign and continuous sign recognition. The single model for both single sign and continuous sign recognition can be trained with single sign data and fine tuning. For example, the sign/text engine circuitry 314 trains this model with single sign data so the loss used is a combination of Classification loss (Cross-entropy, CTC loss, etc.) and Triplet/Contrastive loss (Euclidean distance, cosine similarity, etc.), with hyperparameters controlling their contribution to total loss. Classification loss helps to predict the correct translation, while Triplet/Contrastive loss helps to reduce data repetition and incorporate user feedback.

The sign/text engine circuitry 314 finetunes the model further using continuous sign data on top of single sign data. The continuous sign data, in this example, is a combination of real data and synthetically generated continuous sign data that is created by merging single sign data. In some examples, the training with single sign data and the fine-tuning with continuous sign data may be merged. Also, in this example, the sign/text engine circuitry 314 finetunes the model further using Reinforcement learning and CSRA/ WER as reward.

The sign/text engine circuitry 314 implements the sign/ text model to identify text corresponding to the sign and/or the gloss label. In addition, the sign/text engine circuitry 314 may identify non-manual features in the video of the sign language (e.g., rhythm, cadence, eye gaze, facial expressions, and/or pauses) that are analogous to intonation in spoken language. The sign/text engine circuitry 314 can tag the text with metadata indicative of one or more of the non-manual features.

The TTS engine circuitry 312 converts the text to audio data. In some examples, the TTS engine circuitry 312 tokenizes the text and identifies phonetic transcriptions to the words in the text. The TTS engine circuitry 312 converts the phonetic transcriptions into a sound wave (as audio data). In some examples, the TTS engine circuitry 312 uses the metadata indicative of the non-manual features of the sign language to create or adjust a volume, cadence, tone, and/or emotion of the speech. In other examples, the TTS engine circuitry 312 can use other speech synthesis operations.

The communication server 302 transmits the audio data to the first user device 102 via the translation app 108. The translation app 108 presents the audio data to the hearing person via the loudspeaker 334 or other type of electroacoustic transducer of the first user device 102. In some examples, the communication server 302 transmits the text to the first user device 102 via the translation app 108 for presentation to the hearing person on the display 332.

In some examples, the communication server 302 stores the audio data and the text with the video of the sign language in the storage 304. In some examples, the communication server 302 stores a correlation between the audio data and the text in the storage 304.

In some examples, the hearing person uses the camera 330 on the first user device 102 to practice or train in sign language.

The examples disclosed herein also allow for validation of accuracy of translations. In some examples, the deaf person and/or the hearing person can correct a translation by entering a correction into their respective user devices 102, 104 if the text does not match either the speech output or the avatars. Also, in some examples, if the inference server 308 cannot complete a translation, a blank or other error message is produced and transmitted to the deaf person and/or the hearing person. The deaf person and/or the hearing person can enter a correction into their respective user devices 102. In some examples, the correction is sent via the translation app 108 to the communication server 302 for archiving in the storage 304 and/or for further analysis by the inference server 308.

Figure 5:
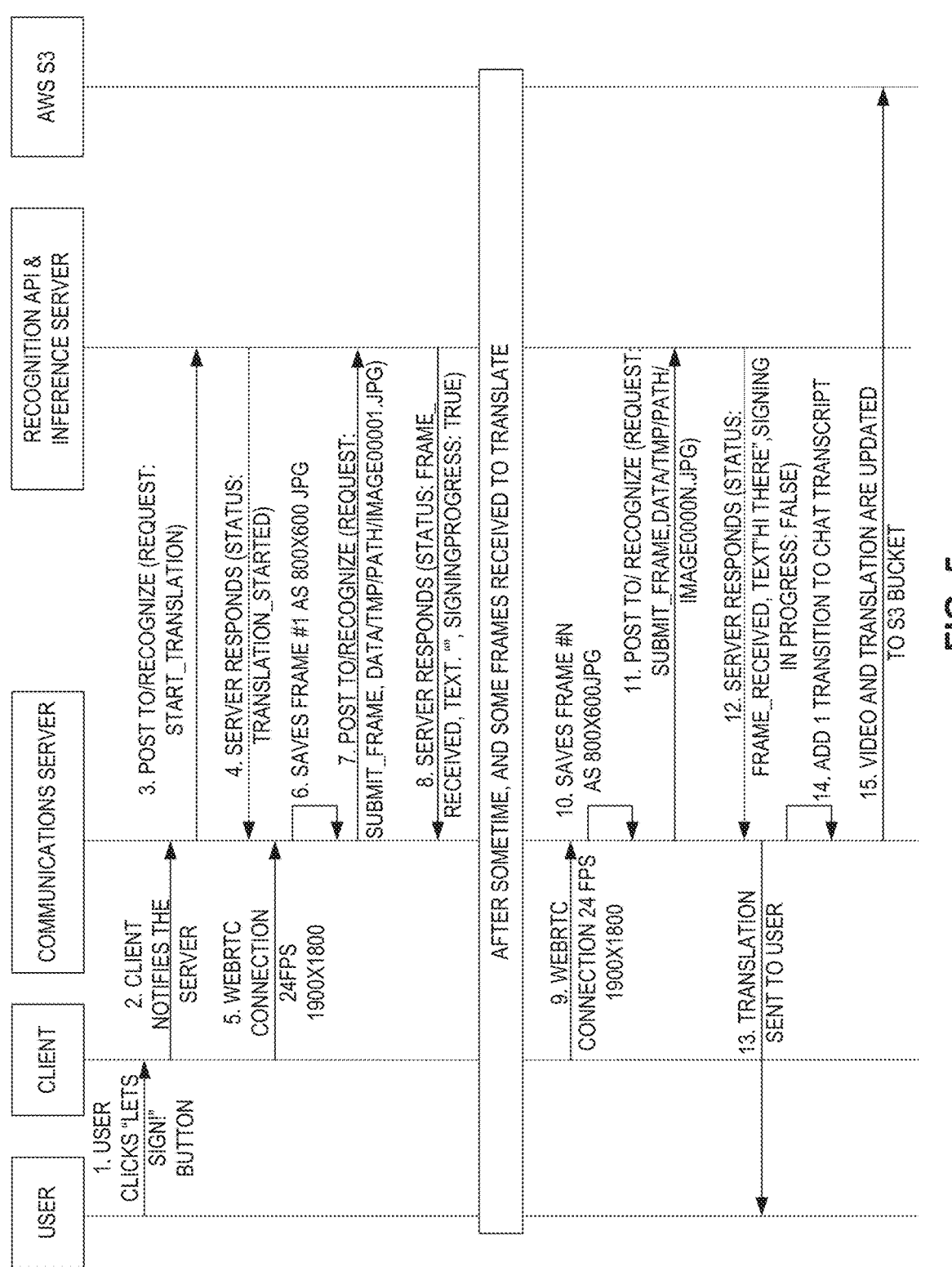
FIG. 5 is a sequence diagram showing example communications in the example system of FIG. 1.

FIG. 5 is a sequence diagram showing example communications in the example system of FIG. 1. In this example scenario, the deaf person (labeled "User" in FIG. 5) sends a translation service request via the translation app 108 (labeled "Client" in FIG. 5) by clicking "Let's Sign" button in the translation app 108. In other examples, the translation service initiation button may be labeled differently. On the sign language side on the second user device 104, the translation app 108 will turn on the camera 360. In some examples, on the hearing side the on the first user device 102, the translation app 108 will turn on both the camera 300 and the microphone 336. After starting a conversation, on the second user device 104, the camera 360 captures the frames of video of the deaf person signing and sends them to the communication server 302.

In this example, the translation app 108 sends the request to the communication server 302. The communication server 302, which can be run on a cloud or on an edge server, sends the request to the recognition API 306 and the inference server 308. The recognition API responds with the status of "Translation Started" to the communication server 3020 and waits for frames of video to be transmitted.

In this example, the translation app 108 sends the images or video captured from the camera 360 to the communication server 302. In some examples, the video is 24 frames per second. In this example, the communication server 302 saves the frames as the frames are received in the storage 304. Also, the communication server 302 sends a recognition post with "SUBMIT_FRAME" status and submit frames as the frames are generated to the recognition API 306. The recognition API 306 responds with status of "FRAME_RECEIVED", and an empty text as a sign that translation began, and a flag named "SigninginProgress" equal to true.

In this example, the translation app 108 continues sending the frames to the communication server 302. The communication server 302 continues to save frames as the frames are received in the storage 304. The communication server 302 sends all the frames with valid signs to the recognition API 306. Thus, in some examples, the communication server 302 performs a preliminary analysis of the video from the camera 360 to determine if a sign appears in a frame of the video. In some examples, the communication server 302 prevent frames without a sign from further processing by the inference server 308.

In this example, the recognition API 306 and the inference server 308 respond with the translated text and a flag with the status of "FRAME_RECEIVED" and another flag: SigningInProgress equal to false. This shows that the inference server 308 has completed the translation.

In this example, the communication server 302 sends the translation to the user (to the hearing person and/or a text back to the deaf person for verification). Also, in this example, the communication server 302 adds the text translation to a chat transcript for presentation to the hearing person and/or the deaf person. The communication server 302 also uploads the video and translation to the cloud.

The translation server 110 of FIG. 3 may be instantiated (e.g., creating an instance of, bring into being for any length of time, materialize, implement, etc.) by processor circuitry such as a central processing unit executing instructions. Additionally or alternatively, the translation server 110 of FIG. 3 may be instantiated (e.g., creating an instance of, bring into being for any length of time, materialize, implement, etc.) by an ASIC or an FPGA structured to perform operations corresponding to the instructions. It should be understood that some or all of the circuitry of FIG. 3 may, thus, be instantiated at the same or different times. Some or all of the circuitry may be instantiated, for example, in one or more threads executing concurrently on hardware and/or in series on hardware. Moreover, in some examples, some or all of the circuitry of FIG. 3 may be implemented by microprocessor circuitry executing instructions to implement one or more virtual machines and/or containers.

In some examples, the translation server 110 is instantiated by processor circuitry executing translation server instructions and/or configured to perform operations such as those represented by the flowchart of FIG. 6.

In some examples, the apparatus includes means for translating between sign language and spoken language. For example, the means for translating may be implemented by the translation server 110. In some examples, the translation server 110 may be instantiated by processor circuitry such as the example processor circuitry 712 of FIG. 78. For instance, the translation server 110 may be instantiated by the example microprocessor 700 of FIG. 7 executing machine executable instructions such as those implemented by the operations 600 of FIG. 6. In some examples, the translation server 110 may be instantiated by hardware logic circuitry, which may be implemented by an ASIC, XPU, or the FPGA circuitry 900 of FIG. 9 structured to perform operations corresponding to the machine readable instructions. Additionally or alternatively, the translation server 110 may be instantiated by any other combination of hardware, software, and/or firmware. For example, the translation server 110 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the system 100 of FIG. 1 is illustrated in FIG. 3, one or more of the elements, processes, and/or devices illustrated in FIG. 3 may be combined, divided, re-arranged, omitted, eliminated, and/or implemented in any other way. Further, the example translation app 108, the example translation server 110, the example communication server 302, the example recognition API 306, the example inference server 308, the example ASR engine circuitry 310, the example TTS engine circuitry 312, and/or the example sign/text engine circuitry 314 may be implemented by hardware alone or by hardware in combination with software and/or firmware. Thus, for example, any of the example translation app 108, the example translation server 110, the example communication server 302, the example recognition API 306, the example inference server 308, the example ASR engine circuitry 310, the example TTS engine circuitry 312, and/or the example sign/text engine circuitry 314, could be implemented by processor circuitry, analog circuit(s), digital circuit(s), logic circuit(s), programmable processor(s), programmable microcontroller(s), graphics processing unit(s) (GPU(s)), digital signal processor(s) (DSP(s)), application specific integrated circuit(s) (ASIC(s)), programmable logic device(s) (PLD(s)), and/or field programmable logic device(s) (FPLD(s)) such as Field Programmable Gate Arrays (FPGAs). Further still, the example system 100 of FIG. 1 may include one or more elements, processes, and/or devices in addition to, or instead of, those illustrated in FIG. 3, and/or may include more than one of any or all of the illustrated elements, processes and devices.

A flowchart representative of example machine readable instructions, which may be executed to configure processor circuitry to implement the translation server 110 of FIG. 3, is shown in FIG. 6. The machine readable instructions may be one or more executable programs or portion(s) of an executable program for execution by processor circuitry, such as the processor circuitry 712 shown in the example processor platform 700 discussed below in connection with FIG. 7 and/or the example processor circuitry discussed below in connection with FIGS. 8 and/or 9. The program may be embodied in software stored on one or more non-transitory computer readable storage media such as a compact disk (CD), a floppy disk, a hard disk drive (HDD), a solid-state drive (SSD), a digital versatile disk (DVD), a Blu-ray disk, a volatile memory (e.g., Random Access Memory (RAM) of any type, etc.), or a non-volatile memory (e.g., electrically erasable programmable read-only memory (EEPROM), FLASH memory, an HDD, an SSD, etc.) associated with processor circuitry located in one or more hardware devices, but the entire program and/or parts thereof could alternatively be executed by one or more hardware devices other than the processor circuitry and/or embodied in firmware or dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a user) or an intermediate client hardware device (e.g., a radio access network (RAN)) gateway that may facilitate communication between a server and an endpoint client hardware device). Similarly, the non-transitory computer readable storage media may include one or more mediums located in one or more hardware devices. Further, although the example program is described with reference to the flowchart illustrated in FIG. 6, many other methods of implementing the example translation server 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more hardware devices (e.g., a single-core processor (e.g., a single core central processor unit (CPU)), a multi-core processor (e.g., a multi-core CPU, an XPU, etc.) in a single machine, multiple processors distributed across multiple servers of a server rack, multiple processors distributed across one or more server racks, a CPU and/or a FPGA located in the same package (e.g., the same integrated circuit (IC) package or in two or more separate housings, etc.).

The machine readable instructions described herein may be stored in one or more of a compressed format, an encrypted format, a fragmented format, a compiled format, an executable format, a packaged format, etc. Machine readable instructions as described herein may be stored as data or a data structure (e.g., as portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of machine executable instructions that implement one or more operations that may together form a program such as that described herein.

In another example, the machine readable instructions may be stored in a state in which they may be read by processor circuitry, but require addition of a library (e.g., a dynamic link library (DLL)), a software development kit (SDK), an application programming interface (API), etc., in order to execute the machine readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C #, Perl, Python, JavaScript, HyperText Markup Language (HTML), Structured Query Language (SQL), Swift, etc.

As mentioned above, the example operations of FIG. 5 may be implemented using executable instructions (e.g., computer and/or machine readable instructions) stored on one or more non-transitory computer and/or machine readable media such as optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms non-transitory computer readable medium, non-transitory computer readable storage medium, non-transitory machine readable medium, and non-transitory machine readable storage medium are expressly defined to include any type of computer readable storage device and/or storage disk and to exclude propagating signals and to exclude transmission media. As used herein, the terms "computer readable storage device" and "machine readable storage device" are defined to include any physical (mechanical and/or electrical) structure to store information, but to exclude propagating signals and to exclude transmission media. Examples of computer readable storage devices and machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer readable instructions, machine readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements or method actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 6 is a flowchart representative of example machine readable instructions and/or example operations 600 that may be executed and/or instantiated by processor circuitry to automatically translate between sign language and spoken language. The machine readable instructions and/or the operations 600 of FIG. 6 include the communication server 302 accessing a stream of audio data from the first device 102 (block 602). The audio data includes spoken language input by a hearing person using the first device 102.

The ASR engine circuitry 310 converts the audio data to text (block 604). The sign/text engine circuitry 314 converts the text to avatar gestures of signs (block 606). The communication server 302 transmits the avatars to the second device 104 (block 608). The second device 104 may be a device used by a deaf person to view the avatars. The inference server 308 determines if there is additional conversation from the first device 102 (block 610). For example, the inference server 308 determines if there is more audio data received from the first device 102. If there is additional conversation from the first device 102 (block 610: YES), the example operations 600 continue with the communication server 302 accessing a stream of audio data from the first device 102 (block 602). If there is no additional conversation from the first device 102 (block 610: NO), the example operations 600 continue with the inference server 308 determining if there is additional conversation from the second device 104 (block 612). If there is no additional conversation from the second device 104 (block 612: NO), the example operations 600 end.

If there is additional conversation from the second device 104 (block 612: YES), the communication server 302 accessing a stream of video data from the second device 104 (block 614). The video data includes sign language input from a deaf person using the second device 104. The sign/text engine circuitry 314 identifies signs in the video (block 616). The sign/text engine circuitry 314 converts the signs to text (block 618). The TTS engine circuitry 312 transforms the text to speech (block 620). The communication server 302 transmits audio data of the speech to the first device 102 (block 622).

The inference server 308 determines if there is additional conversation from the second device 104 (block 624). For example, the inference server 308 determines if there is more video data received from the second device 104. If there is additional conversation from the second device 104 (block 624: YES), the example operations 600 continue with the communication server 302 accessing the video data from the second device 104 (block 614). If there is no additional conversation from the second device 104 (block 624: NO), the example operations 600 continue with the inference server 308 determining if there is additional conversation from the first device 102 (block 626). If there is additional conversation from the first device 102 (block 626: YES), the example operations 600 continue with the communication server 302 accessing a stream of audio data from the first device 102 (block 602). If there is no additional conversation from the first device 102 (block 626: NO), the example operations 600 end.

In some examples, the operations 600 may begin at block 614 with a deaf person initiating the operations. For example, a deaf person using the second device 104 can start the conversation with the hearing person using the first device 102. Both hearing and sign language users can start, pause, and end conversations.

Figure 7:
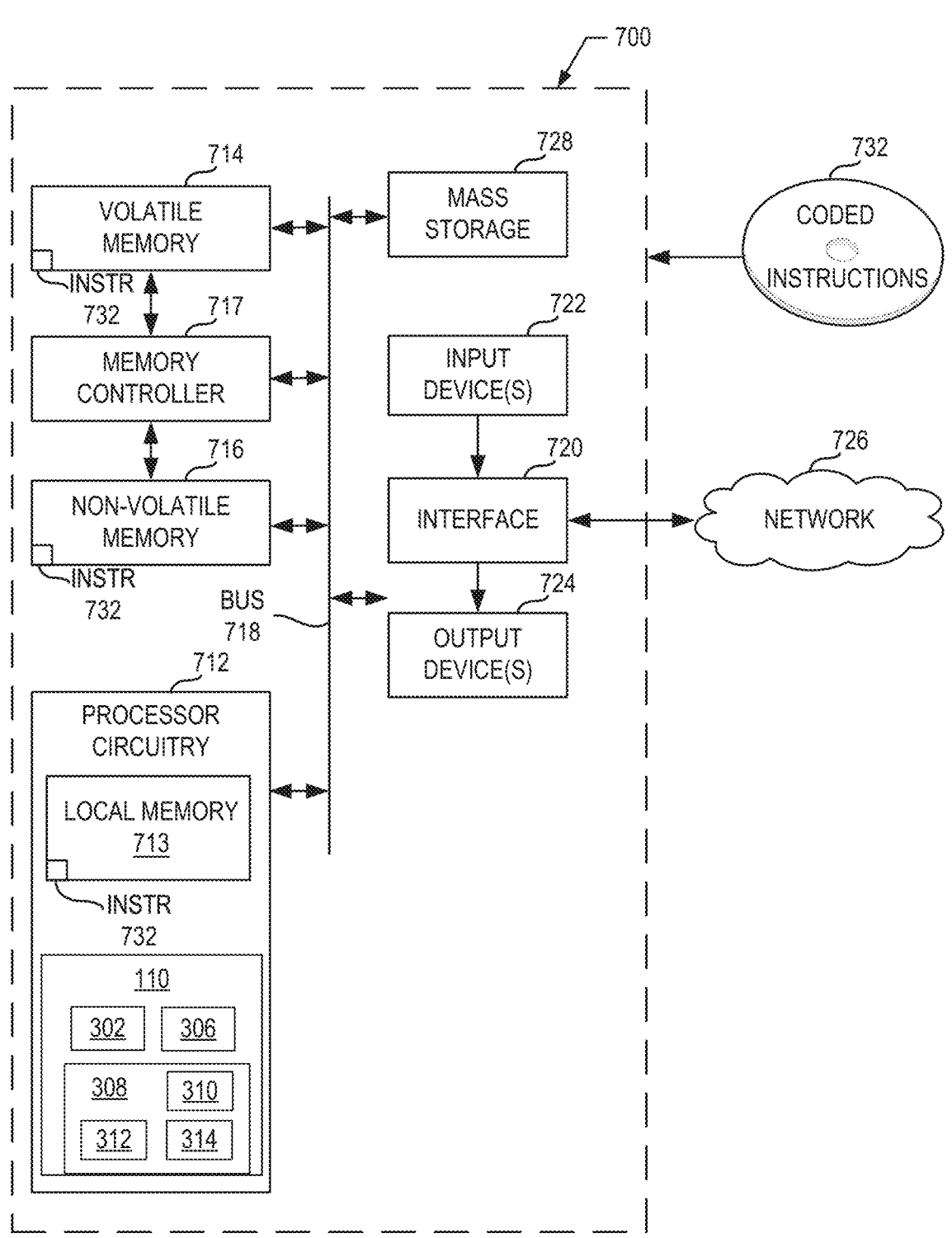
FIG. 7 is a block diagram of an example processing platform including processor circuitry structured to execute the example machine readable instructions and/or the example operations of FIG. 6 to implement the translation server 110 of FIG. 3.

FIG. 7 is a block diagram of an example processor platform 700 structured to execute and/or instantiate the machine readable instructions and/or the operations of FIG. 6 to implement the translation server 110 of FIG. 3. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a gaming console, a personal video recorder, a set top box, a headset (e.g., an augmented reality (AR) headset, a virtual reality (VR) headset, etc.) or other wearable device, or any other type of computing device.

The processor platform 700 of the illustrated example includes processor circuitry 712. The processor circuitry 712 of the illustrated example is hardware. For example, the processor circuitry 712 can be implemented by one or more integrated circuits, logic circuits, FPGAs, microprocessors, CPUs, GPUs, DSPs, and/or microcontrollers from any desired family or manufacturer. The processor circuitry 712 may be implemented by one or more semiconductor based (e.g., silicon based) devices. In this example, the processor circuitry 712 implements the translation server 110, the communication server 302, the recognition API 306, the inference server 308, the ASR engine circuitry 310, the TTS engine circuitry 312, and the sign/text engine circuitry 314.

The processor circuitry 712 of the illustrated example includes a local memory 713 (e.g., a cache, registers, etc.). The processor circuitry 712 of the illustrated example is in communication with a main memory including a volatile memory 714 and a non-volatile memory 716 by a bus 718. The volatile memory 714 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 716 may be implemented by flash memory and/or any other desired type of memory device. Access to the main memory 714, 716 of the illustrated example is controlled by a memory controller 717.

The processor platform 700 of the illustrated example also includes interface circuitry 720. The interface circuitry 720 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 722 are connected to the interface circuitry 720. The input device(s) 722 permit(s) a user to enter data and/or commands into the processor circuitry 712. The input device(s) 722 can be implemented by, for example, an audio sensor, a microphone, a camera (still or video), a keyboard, a button, a mouse, a touchscreen, a track-pad, a trackball, an isopoint device, and/or a voice recognition system.

One or more output devices 724 are also connected to the interface circuitry 720 of the illustrated example. The output device(s) 724 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 720 of the illustrated example, thus, typically includes a graphics driver card, a graphics driver chip, and/or graphics processor circuitry such as a GPU.

The interface circuitry 720 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 726. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The processor platform 700 of the illustrated example also includes one or more mass storage devices 728 to store software and/or data. Examples of such mass storage devices 728 include magnetic storage devices, optical storage devices, floppy disk drives, HDDs, CDs, Blu-ray disk drives, redundant array of independent disks (RAID) systems, solid state storage devices such as flash memory devices and/or SSDs, and DVD drives.

The machine readable instructions 732, which may be implemented by the machine readable instructions of FIG. 7, may be stored in the mass storage device 728, in the volatile memory 714, in the non-volatile memory 716, and/or on a removable non-transitory computer readable storage medium such as a CD or DVD.

Figure 8:
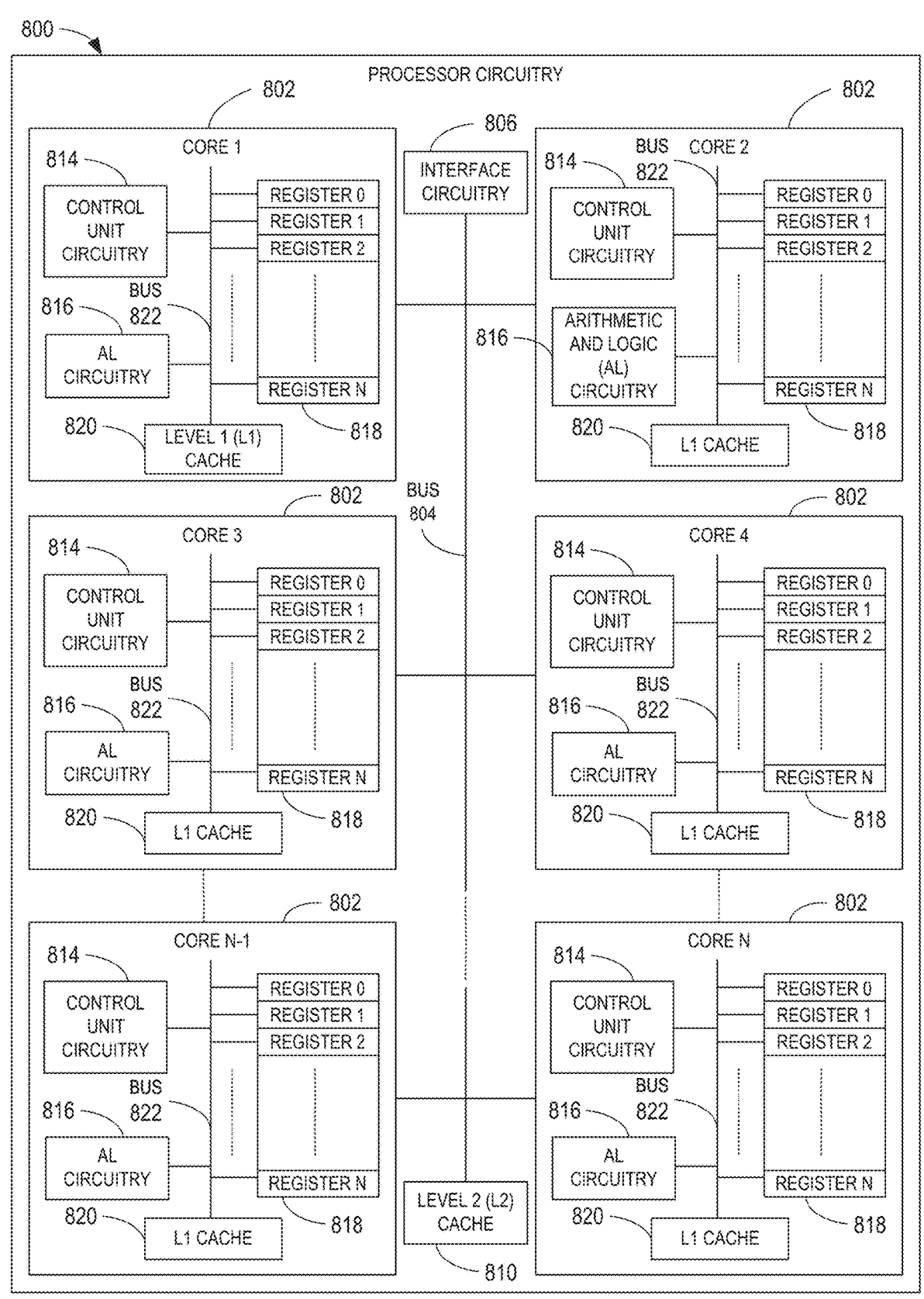
FIG. 8 is a block diagram of an example implementation of the processor circuitry of FIG. 7.

FIG. 8 is a block diagram of an example implementation of the processor circuitry 712 of FIG. 7. In this example, the processor circuitry 712 of FIG. 7 is implemented by a microprocessor 800. For example, the microprocessor 800 may be a general purpose microprocessor (e.g., general purpose microprocessor circuitry). The microprocessor 800 executes some or all of the machine readable instructions of the flowchart of FIG. 6 to effectively instantiate the circuitry of FIG. 3 as logic circuits to perform the operations corresponding to those machine readable instructions. In some such examples, the circuitry of FIG. 3 is instantiated by the hardware circuits of the microprocessor 800 in combination with the instructions. For example, the microprocessor 800 may be implemented by multi-core hardware circuitry such as a CPU, a DSP, a GPU, an XPU, etc. Although it may include any number of example cores 802 (e.g., 1 core), the microprocessor 800 of this example is a multi-core semiconductor device including N cores. The cores 802 of the microprocessor 800 may operate independently or may cooperate to execute machine readable instructions. For example, machine code corresponding to a firmware program, an embedded software program, or a software program may be executed by one of the cores 802 or may be executed by multiple ones of the cores 802 at the same or different times. In some examples, the machine code corresponding to the firmware program, the embedded software program, or the software program is split into threads and executed in parallel by two or more of the cores 802. The software program may correspond to a portion or all of the machine readable instructions and/or operations represented by the flowchart of FIG. 6.

The cores 802 may communicate by a first example bus 804. In some examples, the first bus 804 may be implemented by a communication bus to effectuate communication associated with one(s) of the cores 802. For example, the first bus 804 may be implemented by at least one of an Inter-Integrated Circuit (I2C) bus, a Serial Peripheral Interface (SPI) bus, a PCI bus, or a PCIe bus. Additionally or alternatively, the first bus 804 may be implemented by any other type of computing or electrical bus. The cores 802 may obtain data, instructions, and/or signals from one or more external devices by example interface circuitry 806. The cores 802 may output data, instructions, and/or signals to the one or more external devices by the interface circuitry 806. Although the cores 802 of this example include example local memory 820 (e.g., Level 1 (L1) cache that may be split into an L1 data cache and an L1 instruction cache), the microprocessor 800 also includes example shared memory 810 that may be shared by the cores (e.g., Level 2 (L2 cache)) for high-speed access to data and/or instructions. Data and/or instructions may be transferred (e.g., shared) by writing to and/or reading from the shared memory 810. The local memory 820 of each of the cores 802 and the shared memory 810 may be part of a hierarchy of storage devices including multiple levels of cache memory and the main memory (e.g., the main memory 714, 716 of FIG. 7). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 802 may be referred to as a CPU, DSP, GPU, etc., or any other type of hardware circuitry. Each core 802 includes control unit circuitry 814, arithmetic and logic (AL) circuitry (sometimes referred to as an ALU) 816, a plurality of registers 818, the local memory 820, and a second example bus 822. Other structures may be present. For example, each core 802 may include vector unit circuitry, single instruction multiple data (SIMD) unit circuitry, load/store unit (LSU) circuitry, branch/jump unit circuitry, floating-point unit (FPU) circuitry, etc. The control unit circuitry 814 includes semiconductor-based circuits structured to control (e.g., coordinate) data movement within the corresponding core 802. The AL circuitry 816 includes semiconductor-based circuits structured to perform one or more mathematic and/or logic operations on the data within the corresponding core 802. The AL circuitry 816 of some examples performs integer based operations. In other examples, the AL circuitry 816 also performs floating point operations. In yet other examples, the AL circuitry 816 may include first AL circuitry that performs integer based operations and second AL circuitry that performs floating point operations. In some examples, the AL circuitry 816 may be referred to as an Arithmetic Logic Unit (ALU). The registers 818 are semiconductor-based structures to store data and/or instructions such as results of one or more of the operations performed by the AL circuitry 816 of the corresponding core 802. For example, the registers 818 may include vector register(s), SIMD register(s), general purpose register(s), flag register(s), segment register(s), machine specific register(s), instruction pointer register(s), control register(s), debug register(s), memory management register(s), machine check register(s), etc. The registers 818 may be arranged in a bank as shown in FIG. 8. Alternatively, the registers 818 may be organized in any other arrangement, format, or structure including distributed throughout the core 802 to shorten access time. The second bus 822 may be implemented by at least one of an I2C bus, a SPI bus, a PCI bus, or a PCIe bus Each core 802 and/or, more generally, the microprocessor 800 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 800 is a semiconductor device fabricated to include many transistors interconnected to implement the structures described above in one or more integrated circuits (ICs) contained in one or more packages. The processor circuitry may include and/or cooperate with one or more accelerators. In some examples, accelerators are implemented by logic circuitry to perform certain tasks more quickly and/or efficiently than can be done by a general purpose processor. Examples of accelerators include ASICs and FPGAs such as those discussed herein. A GPU or other programmable device can also be an accelerator. Accelerators may be on-board the processor circuitry, in the same chip package as the processor circuitry and/or in one or more separate packages from the processor circuitry.

Figure 9:
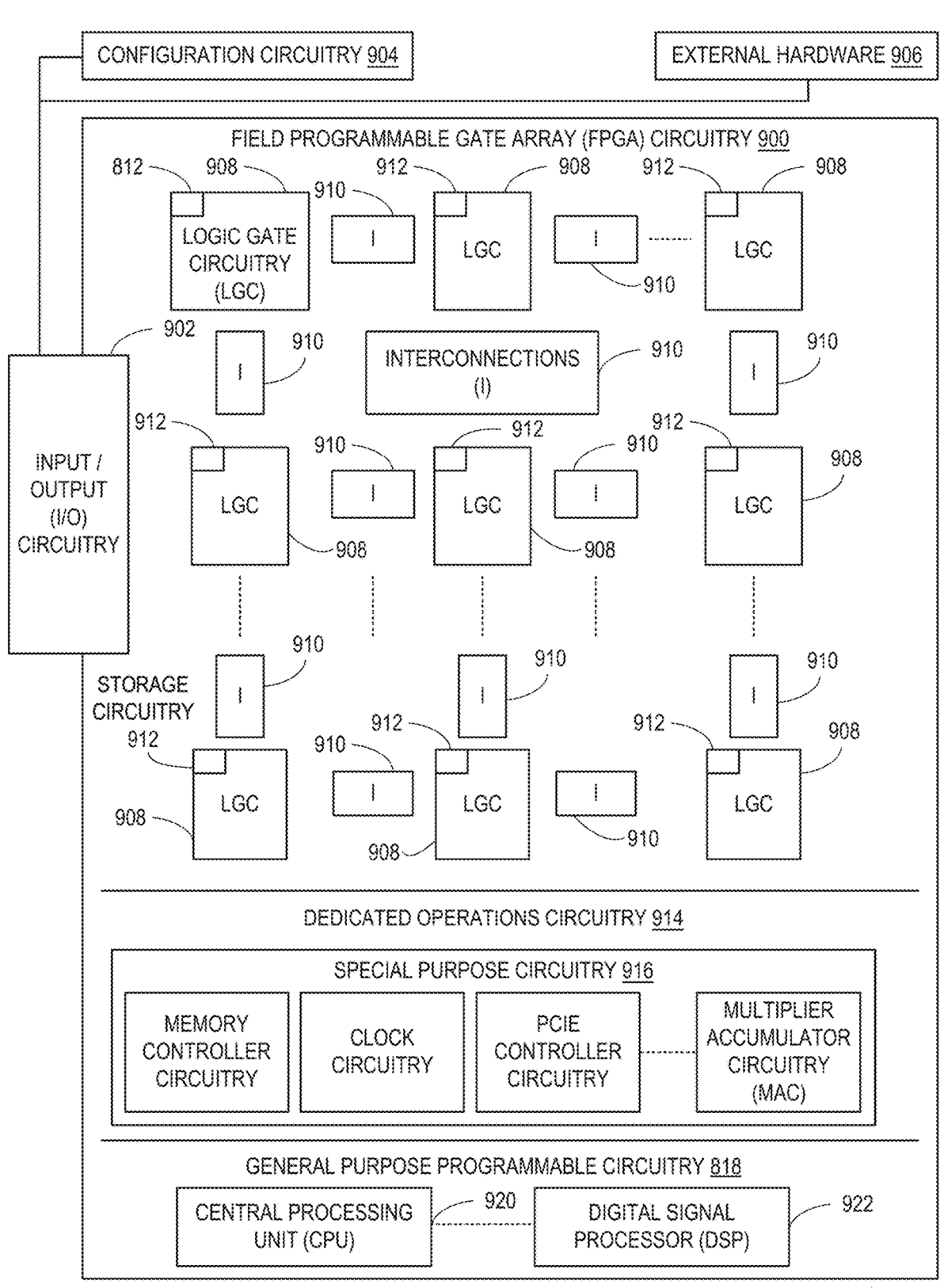
FIG. 9 is a block diagram of another example implementation of the processor circuitry of FIG. 7.

FIG. 9 is a block diagram of another example implementation of the processor circuitry 712 of FIG. 7. In this example, the processor circuitry 712 is implemented by FPGA circuitry 900. For example, the FPGA circuitry 900 may be implemented by an FPGA. The FPGA circuitry 900 can be used, for example, to perform operations that could otherwise be performed by the example microprocessor 800 of FIG. 8 executing corresponding machine readable instructions. However, once configured, the FPGA circuitry 900 instantiates the machine readable instructions in hardware and, thus, can often execute the operations faster than they could be performed by a general purpose microprocessor executing the corresponding software.

More specifically, in contrast to the microprocessor 800 of FIG. 8 described above (which is a general purpose device that may be programmed to execute some or all of the machine readable instructions represented by the flowchart of FIG. 6 but whose interconnections and logic circuitry are fixed once fabricated), the FPGA circuitry 900 of the example of FIG. 7 includes interconnections and logic circuitry that may be configured and/or interconnected in different ways after fabrication to instantiate, for example, some or all of the machine readable instructions represented by the flowchart of FIG. 6. In particular, the FPGA circuitry 900 may be thought of as an array of logic gates, interconnections, and switches. The switches can be programmed to change how the logic gates are interconnected by the interconnections, effectively forming one or more dedicated logic circuits (unless and until the FPGA circuitry 900 is reprogrammed). The configured logic circuits enable the logic gates to cooperate in different ways to perform different operations on data received by input circuitry. Those operations may correspond to some or all of the software represented by the flowchart of FIG. 6. As such, the FPGA circuitry 900 may be structured to effectively instantiate some or all of the machine readable instructions of the flowchart of FIG. 6 as dedicated logic circuits to perform the operations corresponding to those software instructions in a dedicated manner analogous to an ASIC. Therefore, the FPGA circuitry 900 may perform the operations corresponding to the some or all of the machine readable instructions of FIG. 6 faster than the general purpose microprocessor can execute the same.

In the example of FIG. 9, the FPGA circuitry 900 is structured to be programmed (and/or reprogrammed one or more times) by an end user by a hardware description language (HDL) such as Verilog. The FPGA circuitry 900 of FIG. 9, includes example input/output (I/O) circuitry 902 to obtain and/or output data to/from example configuration circuitry 904 and/or external hardware 906. For example, the configuration circuitry 904 may be implemented by interface circuitry that may obtain machine readable instructions to configure the FPGA circuitry 900, or portion(s) thereof. In some such examples, the configuration circuitry 904 may obtain the machine readable instructions from a user, a machine (e.g., hardware circuitry (e.g., programmed or dedicated circuitry) that may implement an Artificial Intelligence/Machine Learning (AI/ML) model to generate the instructions), etc. In some examples, the external hardware 906 may be implemented by external hardware circuitry. For example, the external hardware 906 may be implemented by the microprocessor 800 of FIG. 8. The FPGA circuitry 900 also includes an array of example logic gate circuitry 908, a plurality of example configurable interconnections 910, and example storage circuitry 912. The logic gate circuitry 908 and the configurable interconnections 910 are configurable to instantiate one or more operations that may correspond to at least some of the machine readable instructions of FIG. 6 and/or other desired operations. The logic gate circuitry 908 shown in FIG. 9 is fabricated in groups or blocks. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 908 to enable configuration of the electrical structures and/or the logic gates to form circuits to perform desired operations. The logic gate circuitry 908 may include other electrical structures such as look-up tables (LUTs), registers (e.g., flip-flops or latches), multiplexers, etc.

The configurable interconnections 910 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 908 to program desired logic circuits.

The storage circuitry 912 of the illustrated example is structured to store result(s) of the one or more of the operations performed by corresponding logic gates. The storage circuitry 912 may be implemented by registers or the like. In the illustrated example, the storage circuitry 912 is distributed amongst the logic gate circuitry 908 to facilitate access and increase execution speed.

The example FPGA circuitry 900 of FIG. 9 also includes example Dedicated Operations Circuitry 914. In this example, the Dedicated Operations Circuitry 914 includes special purpose circuitry 916 that may be invoked to implement commonly used functions to avoid the need to program those functions in the field. Examples of such special purpose circuitry 916 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 900 may also include example general purpose programmable circuitry 918 such as an example CPU 920 and/or an example DSP 922. Other general purpose programmable circuitry 918 may additionally or alternatively be present such as a GPU, an XPU, etc., that can be programmed to perform other operations.

Although FIGS. 8 and 9 illustrate two example implementations of the processor circuitry 712 of FIG. 7, many other approaches are contemplated. For example, as mentioned above, modern FPGA circuitry may include an on-board CPU, such as one or more of the example CPU 920 of FIG. 9. Therefore, the processor circuitry 712 of FIG. 7 may additionally be implemented by combining the example microprocessor 800 of FIG. 8 and the example FPGA circuitry 900 of FIG. 9. In some such hybrid examples, a first portion of the machine readable instructions represented by the flowchart of FIG. 6 may be executed by one or more of the cores 802 of FIG. 8, a second portion of the machine readable instructions represented by the flowchart of FIG. 6 may be executed by the FPGA circuitry 900 of FIG. 9, and/or a third portion of the machine readable instructions represented by the flowchart of FIG. 6 may be executed by an ASIC. It should be understood that some or all of the circuitry of FIG. 3 may, thus, be instantiated at the same or different times. Some or all of the circuitry may be instantiated, for example, in one or more threads executing concurrently and/or in series. Moreover, in some examples, some or all of the circuitry of FIG. 3 may be implemented within one or more virtual machines and/or containers executing on the microprocessor.

In some examples, the processor circuitry 712 of FIG. 7 may be in one or more packages. For example, the microprocessor 800 of FIG. 8 and/or the FPGA circuitry 900 of FIG. 9 may be in one or more packages. In some examples, an XPU may be implemented by the processor circuitry 712 of FIG. 7, which may be in one or more packages. For example, the XPU may include a CPU in one package, a DSP in another package, a GPU in yet another package, and an FPGA in still yet another package.

Figure 10:
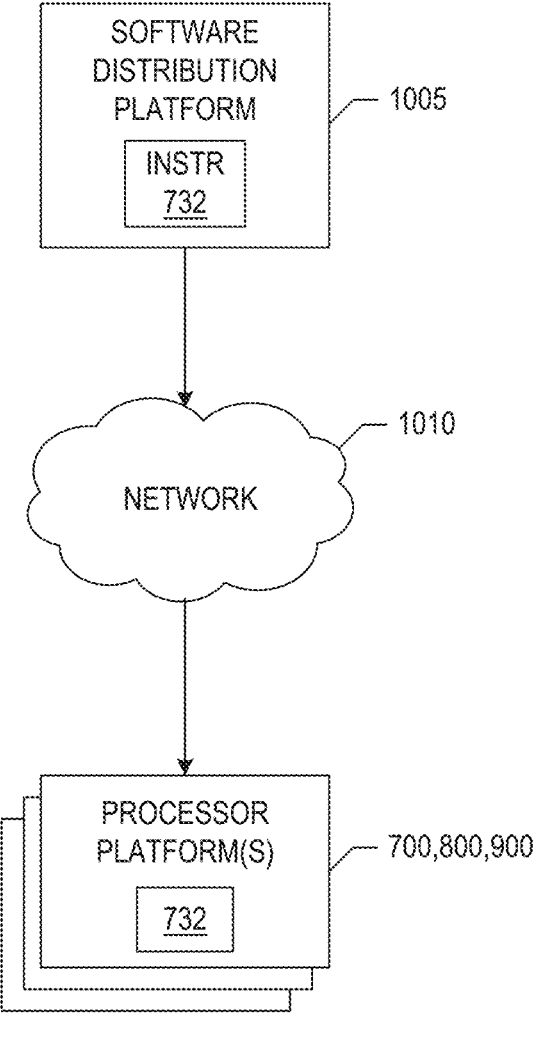
FIG. 10 is a block diagram of an example software distribution platform (e.g., one or more servers) to distribute software (e.g., software corresponding to the example machine readable instructions of FIG. 6) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1005 to distribute software such as the example machine readable instructions 732 of FIG. 7 to hardware devices owned and/or operated by third parties is illustrated in FIG. 10. The example software distribution platform 905 may be implemented by any computer server, data facility, cloud service, etc., capable of storing and transmitting software to other computing devices. The third parties may be customers of the entity owning and/or operating the software distribution platform 1005. For example, the entity that owns and/or operates the software distribution platform 1005 may be a developer, a seller, and/or a licensor of software such as the example machine readable instructions 732 of FIG. 7. The third parties may be consumers, users, retailers, OEMs, etc., who purchase and/or license the software for use and/or re-sale and/or sub-licensing. In the illustrated example, the software distribution platform 1005 includes one or more servers and one or more storage devices. The storage devices store the machine readable instructions 732, which may correspond to the example machine readable instructions 600 of FIG. 6, as described above. The one or more servers of the example software distribution platform 1005 are in communication with an example network 1010, which may correspond to any one or more of the Internet and/or any of the example networks 106 described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 732 from the software distribution platform 1005. For example, the software, which may correspond to the example machine readable instructions 600 of FIG. 6, may be downloaded to the example processor platform 700, which is to execute the machine readable instructions 732 to implement the translation server 110. In some examples, one or more servers of the software distribution platform 1005 periodically offer, transmit, and/or force updates to the software (e.g., the example machine readable instructions 732 of FIG. 7) to ensure improvements, patches, updates, etc., are distributed and applied to the software at the end user devices.

From the foregoing, it will be appreciated that example systems, methods, apparatus, and articles of manufacture have been disclosed that automatically translate between sign language and spoken language. The examples disclosed herein are not biased to a specific signer or speaker. In addition, the examples disclosed herein may support other sign languages and other spoken languages. Also, in some examples, there may be translations among multiple speakers and/or multiple signers.

Methods, apparatus, systems, and articles of manufacture to translation between sign language and spoken language are disclosed. Example 1 includes an apparatus including: at least one memory; machine readable instructions; and processor circuitry to at least one of instantiate or execute the machine readable instructions to: identify sign language in video; and convert the sign language to audio.

Example 2 include the apparatus of Example 1, wherein to convert the sign language to audio, the processor circuitry is to: identify signs in the sign language; convert the signs to text; and convert the text to speech.

Example 3 includes the apparatus of Example 2, wherein the processor circuitry is to: identify non-manual elements in the sign language; and alter at least one of a volume, cadence, tone, or emotion of the audio based on the non-manual elements.

Example 4 includes the apparatus of Example 3, wherein the non-manual elements include at least one of a facial expression, an eye gaze, a rhythm, a cadence, eye gaze, or a pause.

Example 5 includes the apparatus of any of Examples 1-4, wherein the processor circuitry is to convert audio to sign language.

Example 6 includes the apparatus of Example 5, wherein to convert audio to sign language, the processor circuitry is to: convert the audio to text; and convert the text to avatars performing signs.

Example 7 includes the apparatus of Example 6, wherein the processor circuitry is to: identify at least one of a volume, a cadence, a tone, or an emotion in the audio; and select the avatars based on a meaning of the text and the at least one of a volume, a cadence, a tone, or an emotion in the audio.

Example 8 include an apparatus to translate between sign language and spoken language, the apparatus including: at least one memory; machine readable instructions; and processor circuitry to at least one of instantiate or execute the machine readable instructions to: identify a plurality of candidate signs across different frames in video; associate a respective gloss to respective ones of the candidate signs; associate a respective confidence score with the respective glosses; identify overlapping frames of the candidate signs; select one or more of the candidate signs as performed signs based on the respective confidence scores and overlapping frames; and convert the performed signs to audio data.

Example 9 includes the apparatus of Example 8, wherein to convert the performed signs to audio data, the processor circuitry is to convert the performed signs to text.

Example 10 includes the apparatus of Examples 8 or 9, wherein the processor circuitry is to transmit the audio data to a user device including a speaker for conversion of the audio data to sound.

Example 11 includes the apparatus of any of Examples 8-10, wherein the processor circuitry is to: identify non-manual elements in the performed signs; and tag the audio data with at least one of a volume, cadence, tone, or emotion based on the non-manual elements.

Example 12 includes the apparatus of Example 11, wherein the non-manual elements include at least one of a facial expression, an eye gaze, a rhythm, a cadence, or a pause.

Example 13 includes the apparatus of any of Examples 8-12, wherein the processor circuitry is to: identify frames of the video without sign language as non-useful frames; and remove the non-useful frames of the video prior to identifying the plurality of candidate signs.

Example 14 includes the apparatus of any of Examples 8-13, wherein the processor circuitry is to: identify a movement of a person in the video as a non-sign language movement; and disregard the non-sign language movement prior to identifying the plurality of candidate signs.

Example 15 includes the apparatus of any of Examples 8-14, wherein the processor circuitry is to: identify respective time stamps of frames associated with the performed signs; order the performed signs based on the time stamps; and convert the performed signs to the audio data based on the order.

Example 16 includes the apparatus of any of Examples 8-15, wherein the processor circuitry is to: detect a speed of signing in the video; perform a comparison of the speed to a threshold speed; and change a number of frames analyzed to identify the plurality of candidate signs based on the comparison.

Example 17 includes the apparatus of Example 16, wherein the processor circuitry is to: analyze fewer frames when the speed is below the threshold speed; and analyze more frames when the speed is above the threshold speed.

Example 18 includes the apparatus of any of Examples 8-17, wherein to select the performed signs, the processor circuitry is to: identify at least a partial overlap in frames corresponding to a first candidate sign and a second candidate sign; identify a higher confidence score between a first confidence score of the first candidate sign and a second confidence score of the second candidate sign; and select the first candidate sign or the second candidate sign with the higher confidence score as the performed sign.

Example 19 includes a non-transitory machine readable medium including instructions to cause one or more processors to at least: identify a plurality of candidate signs across frames in video, the frames having respective time stamps; identify a respective gloss to respective ones of the candidate signs; rank the respective glosses; identify overlapping candidate signs based on the time stamps; select one or more of the candidate signs as performed signs based on the rank and the overlapping candidate signs; and create at least one of visual text or audio data based on the performed signs.

Example 20 includes the machine readable medium of Example 19, wherein the instructions cause the one or more processors to transmit the audio data to a user device including a speaker for conversion of the audio data to a sound wave.

Example 21 includes the machine readable medium of Examples 19 or 20, wherein the instructions cause the one or more processors to: identify non-manual elements in the performed signs; and tag the audio data with at least one of a volume, cadence, tone, or emotion based on the non-manual elements.

Example 22 includes the machine readable medium of any of Examples 19-21, wherein the instructions cause the one or more processors to: identify frames of the video without sign language as non-useful frames; and ignore the non-useful frames of the video prior to identifying the plurality of candidate signs.

Example 23 includes the machine readable medium of any of Examples 19-22, wherein the instructions cause the one or more processors to: detect a speed of signing in the video; perform a comparison of the speed to a threshold speed; and change a number of frames analyzed to identify the plurality of candidate signs based on the comparison.

Example 24 includes the machine readable medium of Example 23, wherein the instructions cause the one or more processors to skip frames that are analyzed when the speed is below the threshold speed.

Example 25 includes the machine readable medium of Example 23, wherein the instructions cause the one or more processors to synthesize intermediate frames for analysis when the speed is above the threshold speed, the intermediate frames based on one or more key points in surrounding frames.

Example 26 includes a method to convert sign language to spoken language, the method including: identifying, by executing instructions with a processor, a plurality of candidate signs in a video, the video including a plurality of frames; identifying, by executing instructions with the processor, a respective gloss to respective ones of the candidate signs; associating, by executing instructions with the processor, a respective confidence score with the respective glosses; identifying, by executing instructions with the processor, overlapping candidate signs based on respective time stamps of respective frames including the candidate signs; and selecting, by executing instructions with the processor, a sign of the candidate signs as a performed sign based on the respective confidence scores and overlapping candidate signs.

Example 27 includes the method of Example 26, further including: converting the performed sign to audio data; and transmitting the audio data to a remote device for presentation as sound.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus to translate between sign language and spoken language, the apparatus comprising:

at least one memory;

machine readable instructions stored in the memory; and processor circuitry to at least one of instantiate or execute the machine readable instructions to perform operations to translate a real-time conversation between sign language and spoken language, the operations including:

obtain a continuous sign video that captures signs generated during the real-time conversation;

create a list of a plurality of random video segments of the continuous sign video, the plurality of video segments including random start and end times during a duration of the continuous sign video;

identify, via execution of a trained single sign language recognition model that is provided the continuous sign video and the list of random video segments, a plurality of candidate signs, each of the plurality of candidate signs identified based on features identified in respective subsets of the plurality of video segments, wherein at least two of the subsets of the plurality of video segments include one or more of the same video segments;

associate, via the execution of the trained single sign language recognition model, a respective gloss to each of the plurality of candidate signs;

generate, via the execution of the trained single sign language recognition model, a respective confidence score for each of the respective glosses, the confidence score indicating a probability identified by the trained single sign language recognition model that the respective glosses are an accurate translation of the plurality of candidate signs;

determine which of the plurality of candidate signs are identified using one or more of the same video segments;

select one or more of the plurality of candidate signs as performed signs based on the respective confidence scores and which of the plurality of candidate signs are identified using one or more of the same video segments; and generate, via a model, audio data that represents the performed signs, the audio data stored in the memory for conversion to sound waves for the conversation.

2. The apparatus of claim 1, wherein to generate the audio data, the processor circuitry is to convert the performed signs to text.

3. The apparatus of claim 1, wherein the processor circuitry is to transmit the audio data to a user device including a speaker for conversion of the audio data to sound.

4. The apparatus of claim 1, wherein the processor circuitry is to:

identify non-manual elements in the continuous sign video; and adjust the audio data, by adjusting at least one of a volume, cadence, tone, or emotion of speech in the audio data based on the non-manual elements.

5. The apparatus of claim 4, wherein the non-manual elements include at least one of a facial expression, an eye gaze, a rhythm, a cadence, or a pause.

6. The apparatus of claim 1, wherein the processor circuitry is to:

identify frames of the continuous sign video without sign language as non-useful frames; and remove the non-useful frames of the continuous sign video prior to identifying the plurality of candidate signs.

7. The apparatus of claim 1, wherein the processor circuitry is to:

identify a movement of a person in the video as a non-sign language movement; and disregard the non-sign language movement prior to identifying the plurality of candidate signs.

8. The apparatus of claim 1, wherein the processor circuitry is to:

identify respective time stamps of the plurality of video segments associated with the performed signs;

order the performed signs based on the time stamps; and convert the performed signs to the audio data based on the order.

9. The apparatus of claim 1, wherein the processor circuitry is to:

detect a speed of signing in the video;

perform a comparison of the speed to a threshold speed; and change a number of video frames in the plurality of video segments analyzed to identify the plurality of candidate signs based on the comparison.

10. The apparatus of claim 9, wherein the processor circuitry is to:

when the speed is below the threshold speed, not analyze one or more frames of the video to identify the plurality of candidate signs; and when the speed is above the threshold speed, create additional frames for analysis based on interpolation of the frames in the video.

11. The apparatus of claim 1, wherein to select one or more of the candidate signs as the performed signs, the processor circuitry is to:

identify at least a partial overlap in video segments corresponding to a first candidate sign and a second candidate sign;

identify a higher confidence score between a first confidence score of the first candidate sign and a second confidence score of the second candidate sign; and select the first candidate sign or the second candidate sign with the higher confidence score as the performed sign.

12. A non-transitory machine readable medium comprising instructions to cause one or more processors to perform operations to translate a real-time conversation between sign language and spoken language, the operations including:

obtain a continuous sign video that captures signs generated during the real-time conversation;

create a list of a plurality of random video segments of the continuous sign video, the plurality of video segments including random start and end times during a duration of the continuous sign video;

identify, via execution of a trained single sign language recognition model that is provided the continuous sign video and the list of random video segments, a plurality of candidate signs, each of the plurality of candidate signs identified based on features identified in respective subsets of the plurality of video segments, wherein at least two of the subsets of the plurality of video segments include one or more of the same video segments;

associate, via the execution of the trained single sign language recognition model, a respective gloss to each of the plurality of candidate signs;

group the glosses of the plurality of candidate signs that are identified using one or more of the same video segments to form a plurality of gloss groups;

rank the glosses within each of the plurality of gloss groups;

select one of the plurality of candidate signs as performed signs in each of the plurality of gloss groups based on the rank of the glosses in each of the plurality of gloss groups; and generate, via a model, at least one of visual, text, or audio data based on the performed signs.

13. The medium of claim 12, wherein the operations further include transmit the audio data to a user device including a speaker for conversion of the audio data to a sound wave.

14. The medium of claim 12, wherein the operations further include:

identify non-manual elements in the continuous sign video; and adjust the audio data, by adjusting at least one of a volume, cadence, tone, or emotion of speech in the audio data based on the non-manual elements.

15. The medium of claim 12, wherein the operations further include:

identify frames of the continuous sign video without sign language as non-useful frames; and ignore the non-useful frames of the continuous sign video prior to identifying the plurality of candidate signs.

16. The medium of claim 12, wherein the operations further include:

detect a speed of signing in the video;

perform a comparison of the speed to a threshold speed; and change a number of video frames in the plurality of video segments analyzed to identify the plurality of candidate signs based on the comparison.

17. The medium of claim 16, wherein the operations further include when the speed is below the threshold speed, not analyze one or more frames of the video to identify the plurality of candidate signs.

18. The medium of claim 16, wherein the operations further include when the speed is above the threshold speed, create additional frames for analysis based on interpolation of the frames in the video.

19. A method to convert sign language to spoken language, the method comprising:

obtaining a continuous sign video that captures signs generated during a real-time conversation for which translation between sign language and spoken language is occurring;

creating a list of a plurality of random video segments of the continuous sign video, the plurality of video segments including random start and end times during a duration of the continuous sign video;

identifying, via execution of a trained single sign language recognition model that is provided the continuous sign video and the list of random video segments, a plurality of candidate signs, each of the plurality of candidate signs identified based on features identified in respective subsets of the plurality of video segments, wherein at least two of the subsets of the plurality of video segments include one or more of the same video segments;

associating, via the execution of the trained single sign language recognition model, a respective gloss each of the plurality of candidate signs;

generating, via the execution of the trained single sign language recognition model, a respective confidence score for each of the respective glosses, the confidence score indicating a probability identified by the trained single sign language recognition model that the respective glosses are an accurate translation of the plurality of candidate signs;

determining which of the plurality of candidate signs are identified using one or more of the same video segments; and selecting performed signs from the plurality of candidate signs based on the respective confidence scores and which of the plurality of candidate signs are identified using one or more of the same video segments, the performed signs used for the translation between sign language and spoken language during the real-time conversation.

20. The method of claim 19, further including:

converting the performed signs to audio data; and transmitting the audio data to a remote device for presentation as sound.

* * * * *